US009592767B2

(12) United States Patent
Stakoe et al.

(10) Patent No.: US 9,592,767 B2
(45) Date of Patent: Mar. 14, 2017

(54) MULTIPURPOSE CARGO NET AND HOOK SYSTEM

(71) Applicant: Ford Global Technologies, LLC, Dearborn, MI (US)

(72) Inventors: John Andrew Stakoe, Bloomfield Hills, MI (US); Mahesh Bhattacharyya, Novi, MI (US); William Bauer, Canton, MI (US); Timothy Barr, Warren, MI (US); Ryan Kurrle, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/469,672

(22) Filed: Aug. 27, 2014

(65) Prior Publication Data
US 2016/0059787 A1 Mar. 3, 2016

(51) Int. Cl.
*B60R 5/04* (2006.01)

(52) U.S. Cl.
CPC ............... *B60R 5/044* (2013.01); *B60R 5/04* (2013.01)

(58) Field of Classification Search
CPC .................. B60R 5/044; B60R 2011/0064
USPC ... 410/89, 97, 102, 106, 115, 118, 129, 132, 410/135, 139–142; 296/24.43, 24.4, 296/37.16, 37.5; 224/484; 280/749
See application file for complete search history.

(56) References Cited

U.S. PATENT DOCUMENTS

| | | | | |
|---|---|---|---|---|
| 3,767,253 A | * | 10/1973 | Kluetsch | B60P 7/14 410/118 |
| 5,026,231 A | * | 6/1991 | Moore | B60R 21/06 410/118 |
| 5,669,655 A | | 9/1997 | Hammond | |
| 5,769,294 A | | 6/1998 | Heinz et al. | |
| 5,820,189 A | | 10/1998 | Tew | |
| 6,099,222 A | | 8/2000 | Moore | |
| 6,811,207 B2 | | 11/2004 | Dalpizzol et al. | |
| 6,908,269 B1 | | 6/2005 | Youngs et al. | |
| 7,108,005 B1 | | 9/2006 | Christenson et al. | |
| 7,287,796 B2 | | 10/2007 | Coles et al. | |
| 7,559,593 B2 | | 7/2009 | Luik | |
| 7,568,491 B2 | | 8/2009 | Banfill et al. | |
| 7,819,451 B2 | * | 10/2010 | Yoshida | B60R 5/047 410/118 |
| 2013/0221697 A1 | | 8/2013 | Steinbrecher | |

FOREIGN PATENT DOCUMENTS

DE 19520584 A1 12/1996
EP 0659611 A1 6/1995

* cited by examiner

*Primary Examiner* — Stephen Gordon
(74) *Attorney, Agent, or Firm* — Vichit Chea; Price Heneveld LLP

(57) ABSTRACT

A cargo management system for a vehicle includes a first pair, a second pair, and a third pair of anchors. The first and second pairs of anchors are positioned adjacent each other and the third pair of anchors is positioned remote from the first pair. The system further includes a flexible substrate having a first pair of attachment features coupleable with the first pair of anchors and a second pair of attachment features selectively coupleable with the second pair or third pair of anchors.

11 Claims, 9 Drawing Sheets

MULTIPURPOSE CARGO NET AND HOOK SYSTEM

FIELD OF THE INVENTION

The present invention generally relates to a cargo management system for a motor vehicle. In particular the system includes a plurality of anchors for supporting a multi-use substrate in a number of positions.

BACKGROUND OF THE INVENTION

Motor vehicles and, in particular, automobiles often include a designated area for the storage of items, such as a trunk of a sedan or coupe or a partitioned area of a utility vehicle. Such cargo areas often offer very little, if anything to retain objects in a particular position therein, often leading to items shifting, rolling, or falling over within the cargo area during movement of the vehicle. Such movement can result in damage to objects or spilling of objects out of fallen containers and the scattering thereof about the cargo area.

Various devices have been included in some cargo areas to help retain objects therein. These devices can include cargo nets, which are affixed to the floor of a cargo area and often include a stretchable net designed to retain objects thereunder. Still further, various dividers and organizers have been incorporated into cargo areas to help prevent objects from shifting. However, none of such previously-developed devices offer a user thereof the ability to adjust the components thereof to accommodate both the object to be retained or to fit the particular space of the cargo area. Further, such previous devices are only capable of carrying out a single, designated function, meaning that for a user to have different storage options, multiple devices must be made available. Accordingly, further development is desired.

SUMMARY OF THE INVENTION

According to one aspect of the present invention, a cargo management system for a vehicle includes a first pair, a second pair, and a third pair of anchors. The first and second pairs of anchors are positioned adjacent each other and the third pair of anchors is positioned remote from the first pair. The system further includes a flexible substrate having a first pair of attachment features coupleable with the first pair of anchors and a second pair of attachment features selectively coupleable with the second pair or third pair of anchors.

According to another aspect of the present invention, a cargo anchor includes a base defining a first surface and a body extending in a long direction along a path between first and second ends. Each end is coupled with the first surface of the base such that the body defines a closed loop therewith, and the path defines an upwardly-extending middle portion spaced apart from and extending along the first surface to define a hook including a portion of the closed loop.

According to another aspect of the present invention, a cargo management system includes a cargo anchor including a body extending between first and second ends and defining a hook profile along a first plane perpendicular to an axis extending between the first and second ends and a closed loop profile along a second plane parallel to the axis. The system further includes a substrate having an attachment feature with a first portion coupleable with the anchor profile and a second portion coupleable with the loop profile.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
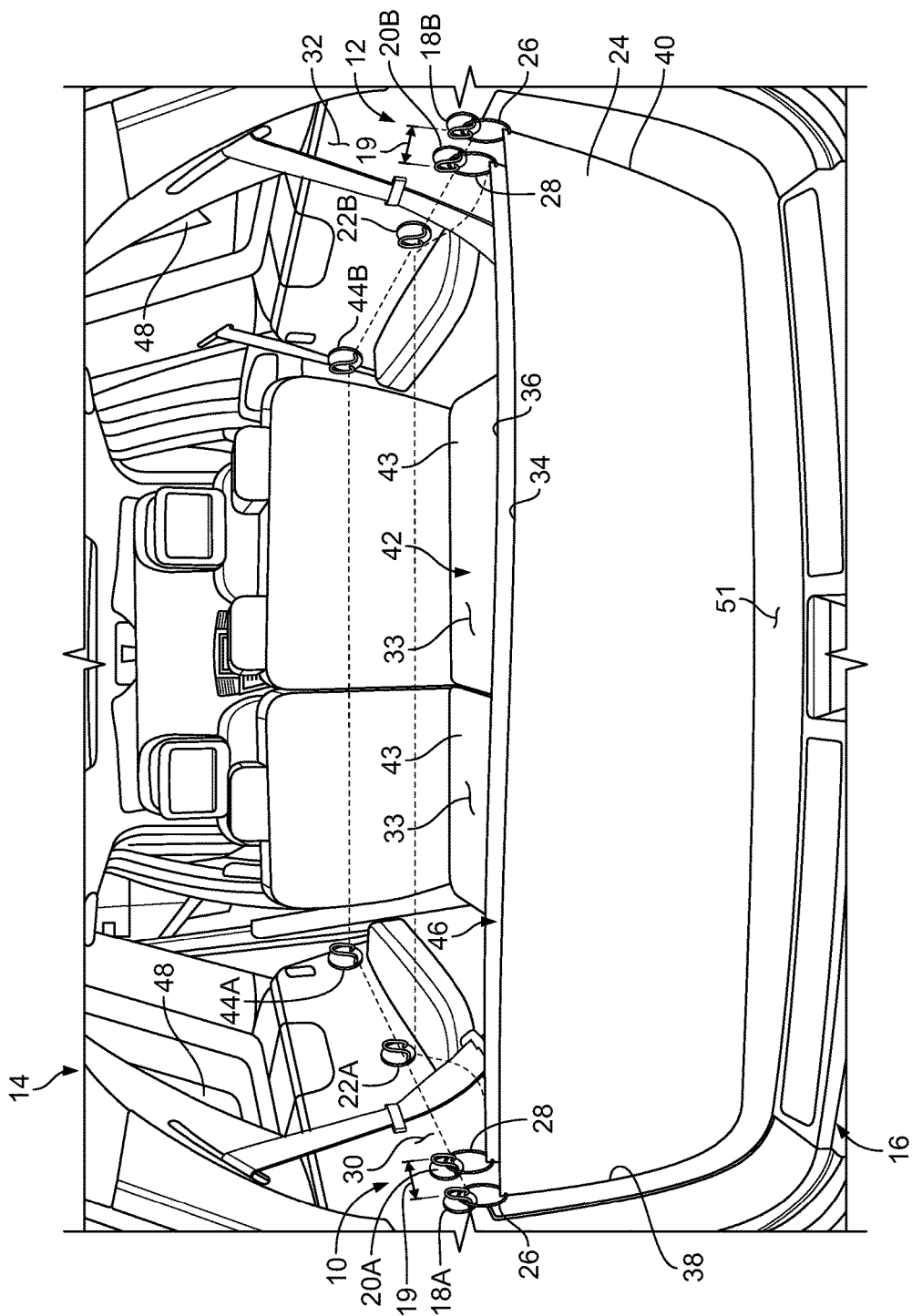
FIG. 1 is a perspective view of a portion of a vehicle interior including a cargo management system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a cargo management system for a vehicle 14. Cargo management system 10 includes a first pair of anchors 18, a second pair of anchors 20 and a third pair of anchors 22, with the first 18 and second 20 pairs of anchors positioned adjacent each other and the third pair of anchors 22 positioned remote from the first pair of anchors 18. Cargo management system 10 further includes a flexible substrate 24 having a first pair of attachment features 26 coupleable with the first pair of anchors 18, and a second pair of attachment features 28 selectively coupleable with the second pair of anchors 20 or the third pair of anchors 22.

As further shown in FIG. 1, each of the first, second, and third pairs of anchors 18, 20, and 22, includes a first anchor 18a, 20a, and 22a disposed on a first lateral side 30 of cargo area 12 of vehicle 14 and a second anchor 18b, 20b, and 22b disposed on a second side 32 of cargo area 12. As illustrated, the respective first side 30 and second side 32 of cargo area 12 can be defined on interior vehicle panels associated with cargo area 12 and the respective anchors 18, 20, and 22 can be disposed thereon by coupling with such panels, or with adjacent support structures therefor, including portions of the body (not shown) of vehicle 14. As further illustrated, respective ones of the various pairs of anchors 18, 20, and 22 can be laterally aligned with one another along the respective sides 30 and 32 of cargo area 12 on which they are disposed. That is, each of anchors 18a and 18b can be positioned at a generally equal distance from cargo opening 16 in the direction from the back of the vehicle 14 to the front of vehicle 14, and can be positioned in a generally identical vertical position with respect to vehicle 14. Similarly, second anchors 20a and 20b can be similarly positioned to laterally align across cargo area 12, as can third anchors 22a and 22b, by being similarly disposed along the respective sides 30 and 32 of cargo area 12.

Figure 2:
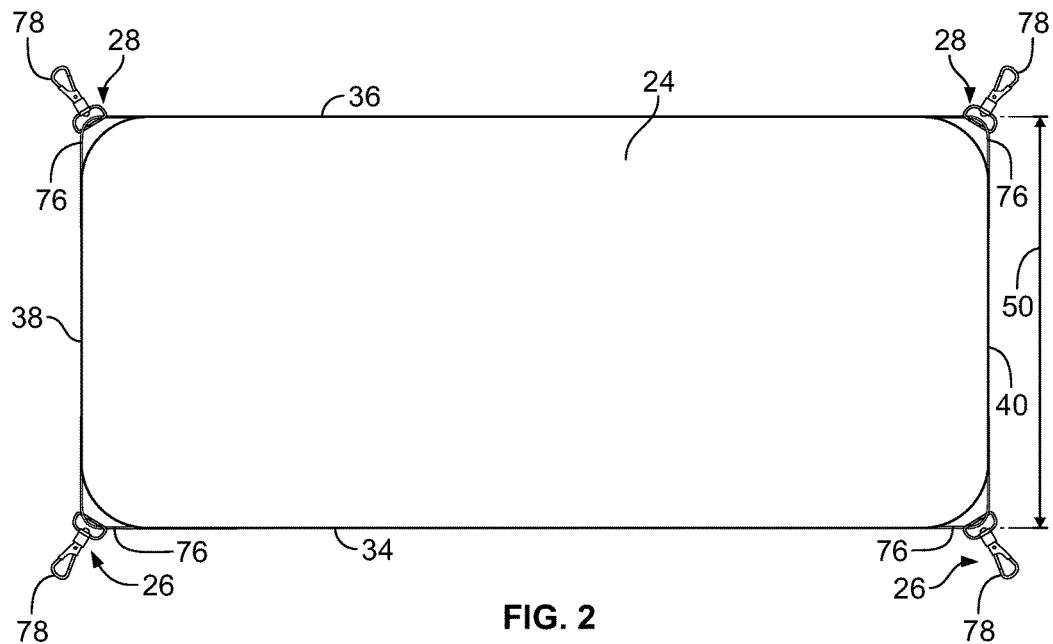
FIG. 2 is a top elevational view of a cargo net used in the system of FIG. 1.

As shown in FIG. 2, substrate 24 can be generally rectangularly shaped with first and second longitudinal sides 34 and 36 defining a first side of the rectangle (long sides, as depicted in FIG. 2), and first and second lateral sides 38 and 40 (short sides, as depicted in FIG. 2) bounding the remaining portions thereof and respectively intersecting the longitudinal sides 34 and 36 at corners of the substrate 24. Respective ones of first pair of attachment features 26 can be positioned at corners formed by the intersection of the first and second lateral sides 38 and 40 with first longitudinal side 34. Similarly, respective ones of second attachment features 28 can be positioned at opposite corners of substrate 24 located at the intersection of first lateral side 38 and second lateral side 40 respectively with second longitudinal side 36. As shown in FIG. 1, respective ones of first attachment features 26 can, accordingly, be affixed with one each of first anchors 18a and 18b such that first longitudinal side 34 of substrate 24 extends laterally across cargo area 12 between first anchors 18a and 18b. Similarly, in a first configuration shown in FIG. 1, respective ones of the second attachment features 28 can be affixed to one each of the third anchors 22a and 22b with second longitudinal side 36 of substrate 24 extending laterally along cargo area 12 between third anchors 22a and 22b. As such, substrate 24 as a whole is suspended within cargo area 12 and extends laterally across cargo area 12 and also at least partially along cargo area 12 in a direction from the front of the vehicle 14 to the rear of the vehicle 14. As such, in a first configuration, shown in FIG. 1, when affixed between first anchors 18 and third anchors 22 substrate 24 can serve as a cargo cover for a portion of cargo area 12 such that substrate 24 can generally obscure contents of cargo area 12 from view from the exterior of vehicle 14.

As also shown in FIG. 1, substrate 24 can be used in the second position with one each of first attachment features 26 still coupled with first anchors 18a and 18b, but with second attachment features 28 respectively coupled with one each of second anchors 20a and 20b. As mentioned above, second anchors 20a and 20b are positioned respectively along first and second sides 30 and 32 of cargo area 12 in positions longitudinally adjacent to the corresponding first anchors 18a and 18b. As such, when substrate 24 is coupled with first anchors 18 and second anchors 20, first and second longitudinal sides 34 and 36 of substrate 24 extend laterally across cargo area 12 in locations that are longitudinally adjacent to each other. For example, a distance 19 between first anchors 18 and second anchors 20 along the respective sides 30 and 32 of cargo area 12 can be between about 25 mm and 50 mm. When in such a position, the portions of substrate 24 between first and second longitudinal sides 34 and 36 will generally depend downwardly between first anchors 18 and second anchors 20, as well as between first and second longitudinal sides 34 and 36. In such a configuration, substrate 24 can be used as a cargo pouch, with longitudinal sides 34 and 36 defining adjacent, upper edges thereof, such that loose objects can be placed therein to be held in position, or tall objects can be held therein in a generally vertical position.

Figure 3:
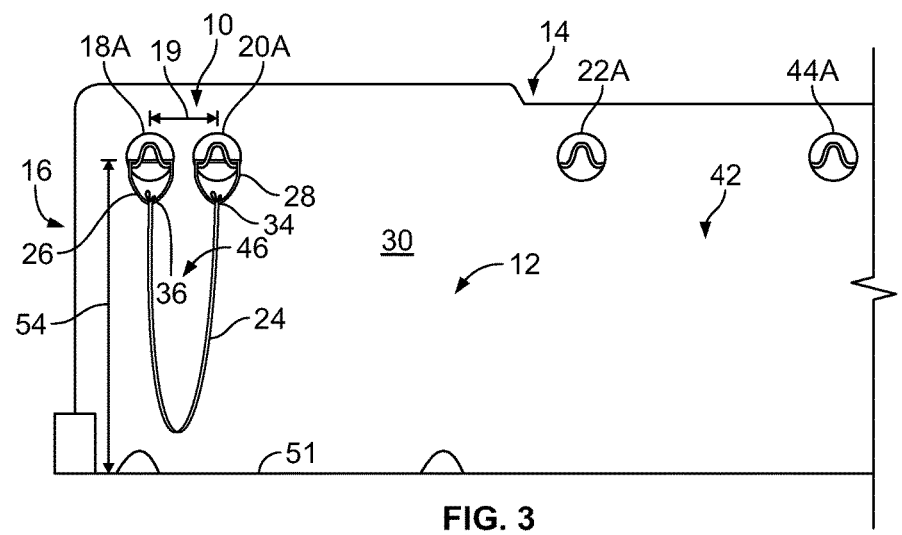
FIG. 3 is a side plan view of a portion of the system of FIG. 1 in a first arrangement.
Figure 4:
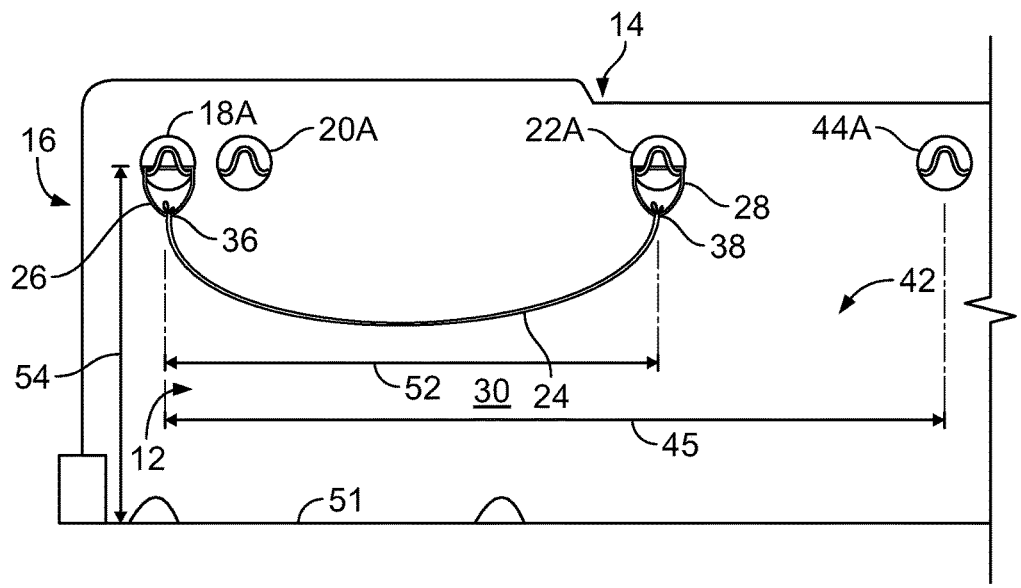
FIG. 4 is a side plan view of a portion of the system of FIG. 1 in a second arrangement.

To facilitate the usability of substrate 24 in both the cargo cover position, wherein second attachment features 28 are coupled with third anchors 22, and the pouch configuration, wherein second attachment features 28 are coupled with second anchors 20, the distances between first anchors 18 and both second anchors 20 and third anchors 22 can be based, at least partially, on length 50 of substrate 24. For example, as shown in FIG. 3 each of first anchors 18, second anchors 20, and third anchors 22 can be positioned above floor 51 at a height 54 that is equal to at least one-half of length 50. Such a configuration allows for substrate 24 to depend freely from first and second attachment features 26 and 28 without interfering with floor 51 when second attachment features 28 are coupled with second anchors 20. Further, third anchors 22 can be spaced apart from first anchors 18 at a distance 52 that is approximately equal to length 50 of substrate 24. This can provide for an arrangement in which substrate 24 is generally taught as it extends over cargo area 12 in the cargo cover position, as shown in FIG. 4. In an embodiment, substrate 24 can have a length of between about 60 cm and 100 cm and distance 52 between first anchors 18 and third anchors 22 can be substantially equal thereto (+/−10%, e.g.) and each of anchors 18, 20, and 22 can be positioned along the respective sides 30 and 32 at a corresponding height 54 of between about 30 cm and 50 cm (+/−10%). The respective spacing between anchors 18, 20, and 22 may vary in other examples from the ranges listed herein, but may, nonetheless, reflect similar coordination with the size of substrate 24 and the corresponding spacing of attachment features 26 and 28. In the examples shown in FIGS. 3 and 4, the height 54 of anchors 18, 20, and 22 can be such that anchors 18, 20, and 22 are positioned below a window 48 within cargo area 12. Such a window 48 can be present, for example, in the cargo area 12 of a utility vehicle, station wagon, or the like. Accordingly, substrate 24, when used in the cargo net position as shown in FIG. 4, can obscure otherwise visible objects within cargo area 12.

Figure 5:
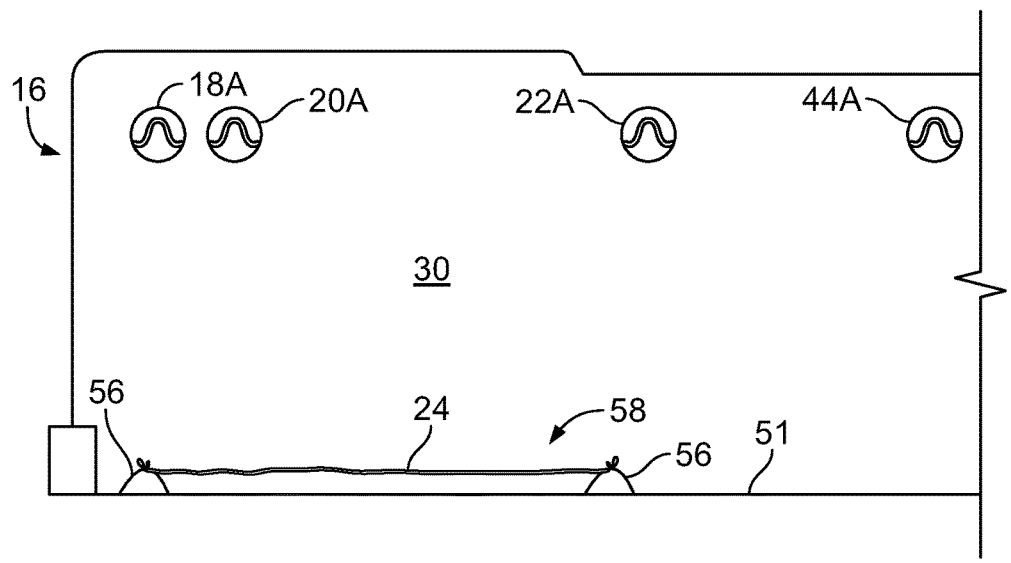
FIG. 5 is a side plan view of a portion of the system of FIG. 1 in a third arrangement.

As shown in FIG. 5, system 10 can further include an additional set of anchors 56 with two anchors 56 each positioned along floor 51 on both first side 30 and second side 32 of cargo area 12. As such, one each of attachment features 26 and 28 can be coupled with respective ones of floor anchors 56 such that substrate 24 extends laterally across cargo area 12 adjacent to floor 51 and along at least a portion of length of cargo area 12. As shown in FIG. 5, ones of floor anchors 56 along the same side, first side 30 or second side 32, of cargo area 12 can be spaced apart along the length of cargo area 12 by the same distance 52 as third anchors 22 from first anchors 18. Such an arrangement can allow for a substrate 24 to act as a cargo net, able to receive items between substrate 24 and floor 51 to generally maintain a position of such objects within cargo area 12.

As further shown in FIG. 1, system 10 can include a fourth pair of anchors 44 with one anchor each 44a and 44b disposed along opposites sides 30 and 32 of cargo area 12 at a location remote from cargo opening 16 and beyond first anchors 18, second anchors 20 and third anchors 22. As shown in FIG. 1, fourth anchors 44 can be positioned within an expansion area 42 of vehicle 14 that can be occupied by seats 43 that can be foldable so as to be capable of being selectively be occupied by passengers of vehicle 14 or stowed such that area 42 can be used for vehicle cargo. As such fourth anchors 44 can be coupled with second attachment features 28 of substrate 24 to support substrate 24 in the position of a cargo cover extending at least partially within cargo expansion area 42. In the example shown in FIG. 1, substrate 24 can be configured such that length 50 corresponds to the distance between first anchors 18 and fourth anchors 44 such that substrate 24 extends longitudinally throughout both cargo area 12 and cargo expansion area 42 when first attachment features 26 are coupled with first anchors 18 and second attachment features 28 are coupled with fourth anchors 44. In such a configuration, substrate 24 may sag or otherwise depend downwardly somewhat between first longitudinal side 34 and second longitudinal side 36 thereof when second attachment features 28 are coupled with third anchors 22. In another example, a variation of substrate 24 can include additional attachment features (not shown) positioned along the lateral sides 38 and 40 thereof in a position to couple with third anchors 22. In such an example, when seats 43 are in use by an occupant, substrate 24 can be left uncoupled with fourth anchors 44 such that substrate 24 extends over cargo area 12 and an excess portion thereof can depend downwardly behind seats 43 within cargo area 12. In a further variation, substrate 24 can be of an extendable material, such as a mesh, or net with elastic supports to allow substrate 24 to extend between first anchors 18 and either third anchors 22 and fourth anchors 44 in a generally taut manner.

Figure 6:
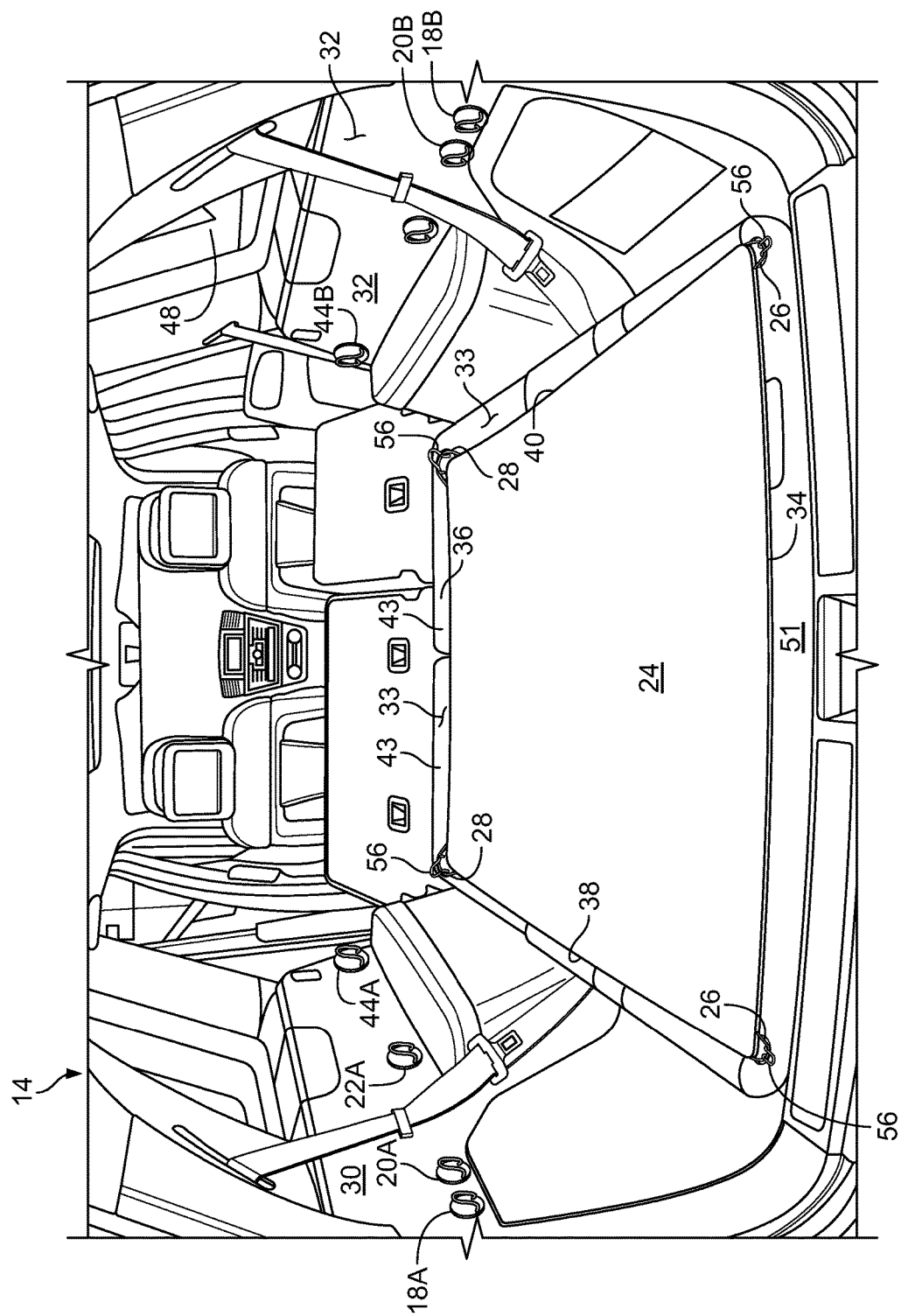
FIG. 6 is a perspective view of a portion of the vehicle interior of FIG. 1, including the cargo management system thereof in a further arrangement thereof.

As further shown in FIG. 6, a variation of floor anchors 56 can include anchors 56 positioned within expansion area 42, such as by being disposed along a rear surface 33 of seats 43. In such an example, such anchors 56 can function as floor anchors, as described above, when seats 43 are in a stowed position, and can further act as third anchors 22 when seats 43 are in a vertical position. Such a configuration can allow substrate 24 to act as an extended cargo net to retain objects along floor 51 of vehicle 14, including within cargo expansion area 42.

Figure 7A:
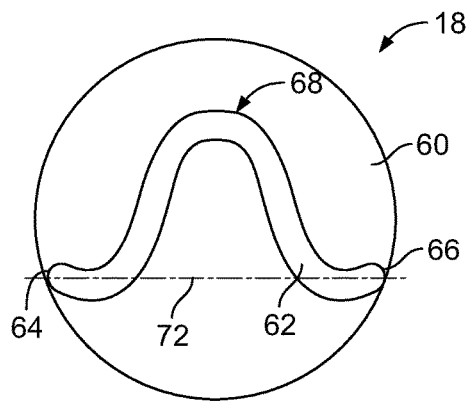
FIG. 7A is a front elevational view of a hook that can be used in connection with the cargo management system of FIG. 1.
Figure 7B:
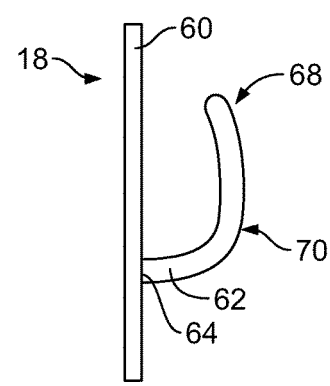
FIG. 7B is a side view of the hook of FIG. 7A.
Figure 7C:
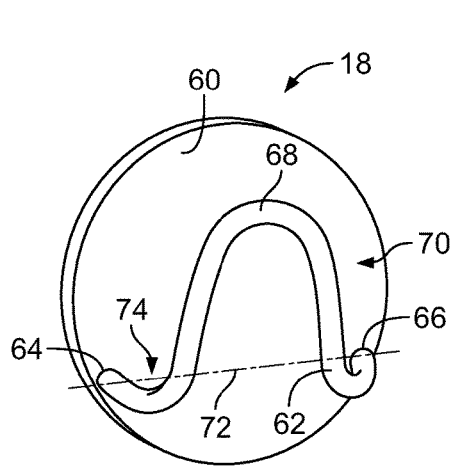
FIG. 7C is a perspective view of the hook of FIG. 7A.

Any of the anchors described above, including first anchors 18, second anchors 20, third anchors 22, fourth anchors 44, floor anchors 56, or any others of the anchors described herein can be a multi-function anchor, designated generally as anchor 18 in and with respect to the discussion of FIGS. 7A-7C. In the example shown, body 62 of anchor 18 extends from base 60, such that base 60 can be coupled near any of the various locations described herein for anchors, such as first anchors 18, second anchors 20, or third anchors 22, among others. Body 62 extends from base 60 in a manner such that any number of objects can be retained thereon, including by coupling of first or second attachment features 26 or 28 therewith. As shown in FIGS. 7A-7C, body 62 extends along a path between a first end 64 and a second end 66. Specifically, the path of body 62 is such that a middle portion 68 of body 62 is positioned so as to be spaced apart from and to extend along base 60 such that in profile, such as shown in FIG. 7B (i.e. perpendicular to axis 72 between first end 64 and second end 66), body 62 defines a hook 70. Further, the path of body 62 can be such that body 62 defines a closed loop 74 with base 60. As such, various objects can be quickly hung on anchor 18 over hook profile 70, and retained thereon by gravity with such objects being further quickly removable by lifting off of anchor 18.

Figure 8:
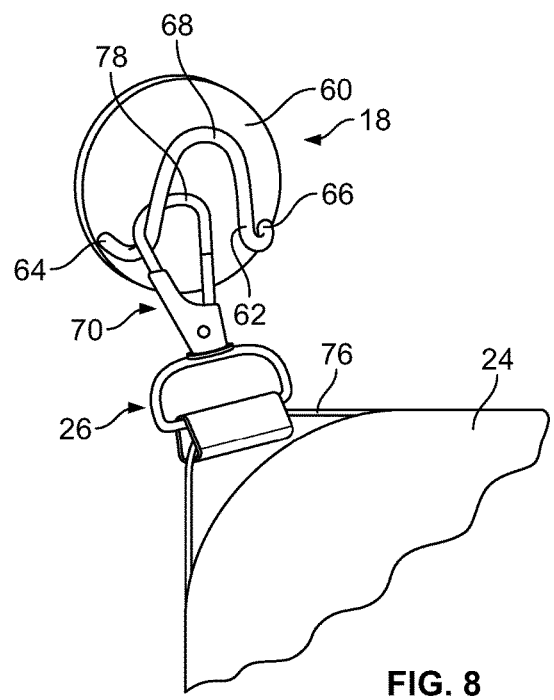
FIG. 8 is a perspective view of the hook of FIGS. 7A-7C coupled with an attachment feature in a first arrangement.
Figure 9:
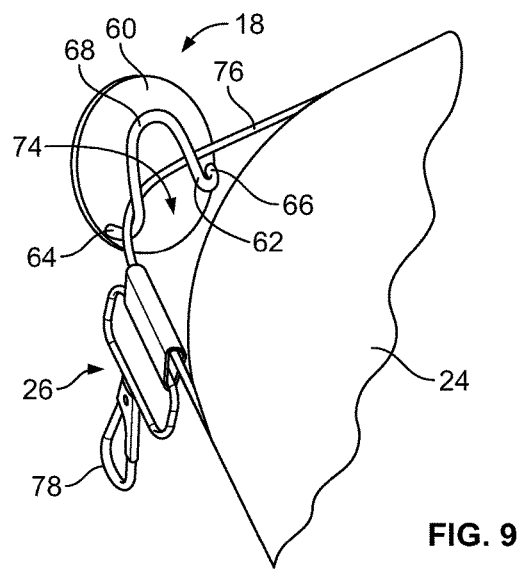
FIG. 9 is a perspective view of the hook of FIGS. 7A-7C coupled with an attachment feature in a second arrangement.

Additionally, objects can be securely fastened onto such an anchor 18 by attachment of a specifically-adapted feature thereof through loop 74. For example, as shown in FIG. 2, both first attachment features 26 and second attachment features 28 of substrate 24 can include an attachment loop 76 and an attachment clip 78. As such, each of the individual attachment features 26 and 28 can be coupled with a respective one of the anchors 18, 20, or 22, for example, by positioning attachment loop 76 over middle portion 68 of body 62 so as to interengage with hook 70, as shown in FIG. 9. Alternatively, any one of the attachment features 26 and 28 can be coupled with a respective anchor 18, 20, or 22, for example, by engaging the clip portion 78 thereof with the body 62 thereof such that the clip surrounds body 62 and passes through loop 74, thereby retaining attachment clip 78 on the corresponding anchor 18, 20, or 22, as shown in FIG. 8. Such varying coupling options of substrate 24 with a corresponding anchor 18, 20, or 22, allows for a user to select a type of coupling at any of the various points of coupling between substrate 24 and vehicle cargo area 12. For example, a user may desire to have substrate 24 coupled at second attachment features 28 with third anchors 22 using attachment clips 78 so that substrate 24 can be pulled tightly over cargo area 12 when substrate 24 is used as a cargo cover. Similarly in such type of use, the user may desire to couple first attachment features 26 with first anchors 18 using attachment loops 76 so as to easily be able to couple substrate 24 in position or remove substrate 24 from such a position to gain access to any objects within cargo area 12. In a further example, when substrate 24 is used as a cargo net such as shown in FIGS. 5 and 6, a user may desire to couple both first attachment features 26 and second attachment features 28 with floor anchors 56 using attachment clips 78 to maintain substrate 24 in the desired position adjacent to floor 51 of cargo area 12 when objects are positioned thereunder.

Figure 10:
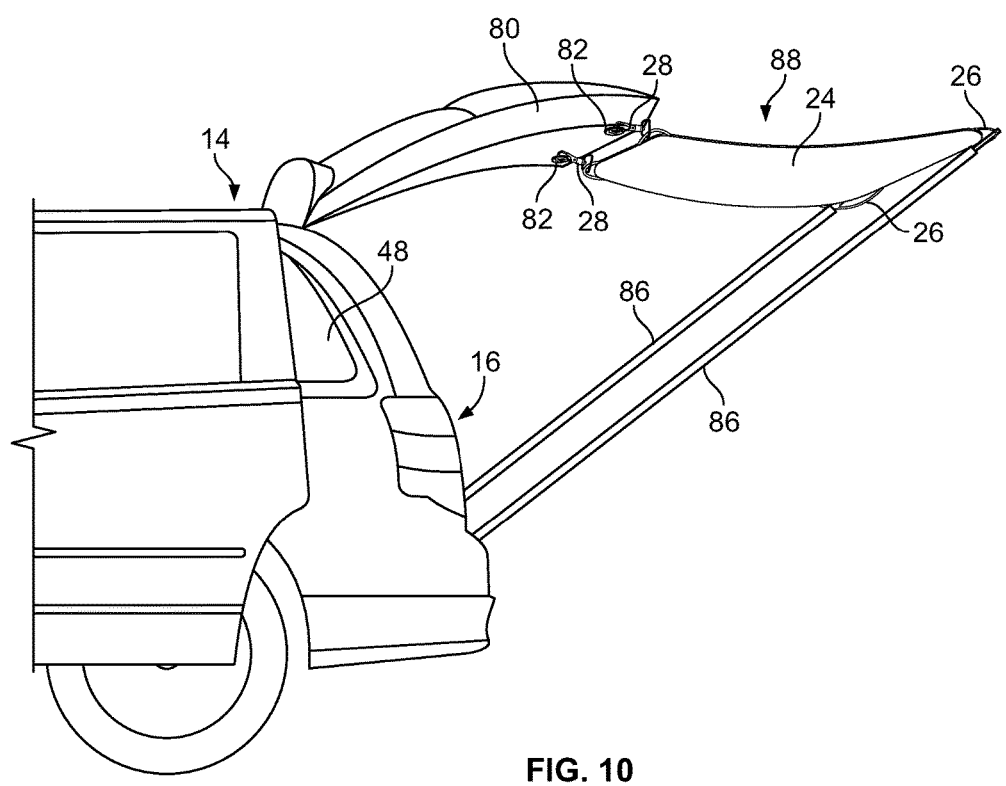
FIG. 10 is a side elevational view of the exterior of a vehicle with a cargo management system of FIG. 1 in a further alternative arrangement.
Figure 11:
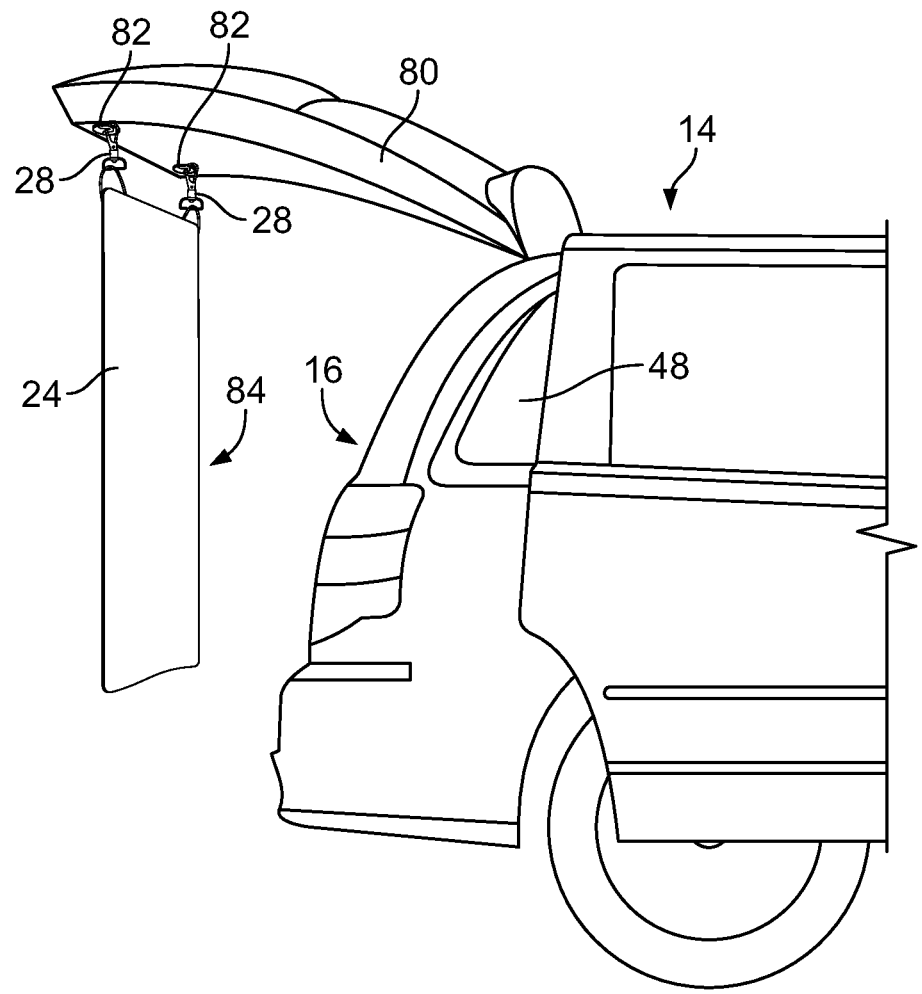
FIG. 11 is a side elevational view of the exterior of a vehicle with a cargo management system of FIG. 1 in a still further alternative arrangement.

As shown in FIGS. 10 and 11, an additional pair of anchors 82 can be disposed on a portion of vehicle liftgate 80 such that substrate 24 can be coupled therewith using either of first attachment features 26 or second attachment features 28. In such use substrate 24 can be allowed to freely depend downwardly from liftgate 80, when in the open position, to form a curtain over cargo area 12 or can be further supported using a pair of poles 86 coupled with the attachment features 26 or 28 opposite those coupled with liftgate anchors 82. Support poles 86 can be configured to rest on the ground adjacent vehicle 14 or can, as shown in FIG. 10, couple with a portion of vehicle 14 adjacent cargo opening 16.

Figure 12:
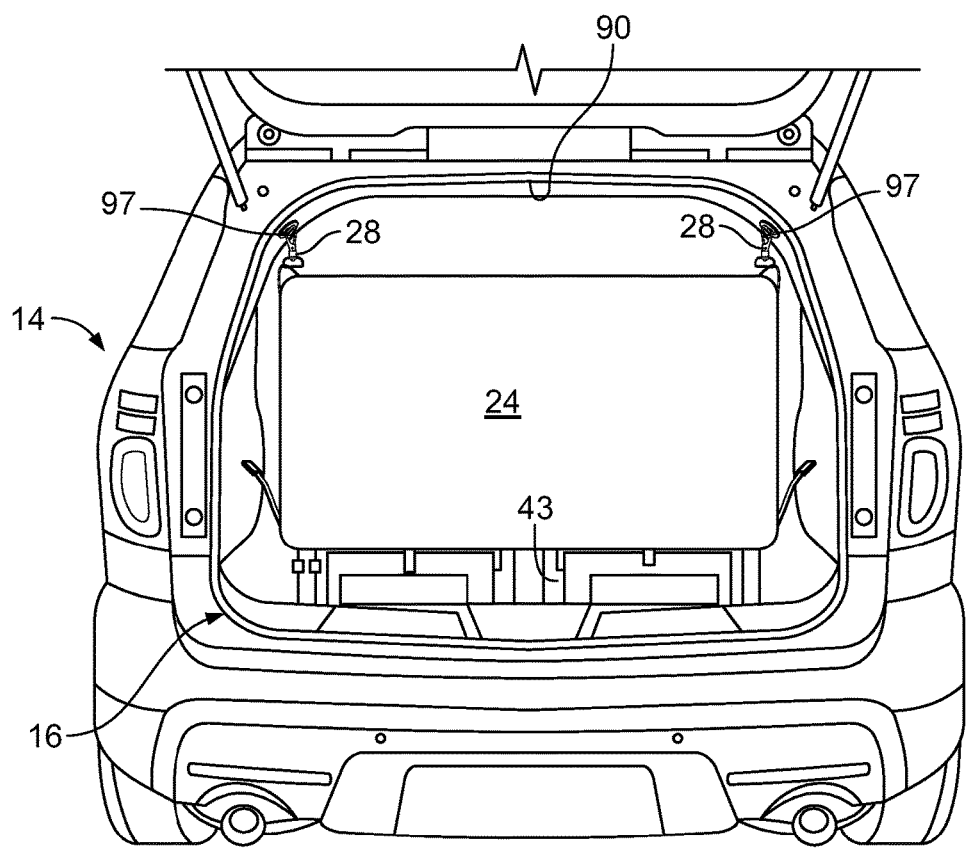
FIG. 12 is a perspective view of a portion of the vehicle interior of FIG. 1, including the cargo management system thereof in a further arrangement.
Figure 13:
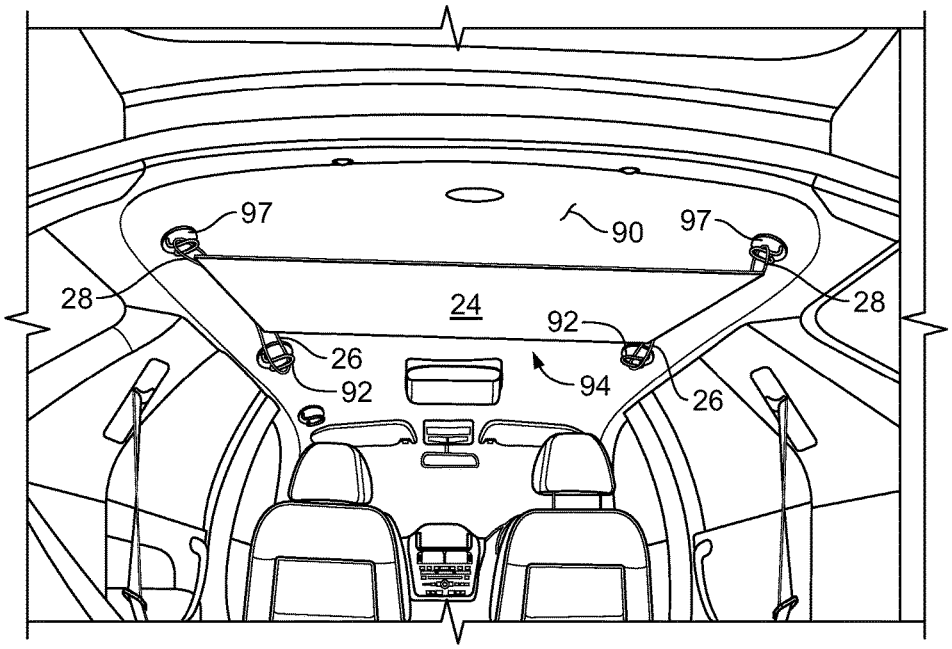
FIG. 13 is a perspective view of a portion of the vehicle interior of FIG. 1, including the cargo management system thereof in a still further arrangement.

As further shown in FIGS. 12 and 13 a plurality of ceiling anchors 92 can be disposed along ceiling 90 of vehicle 14. Substrate 24 can then be coupled with ceiling anchors 92 using one or both of first and second attachment features 26 and 28. As shown in FIG. 12 first attachment features 26 can be used to couple with a rearward pair of ceiling anchors 92 adjacent seats 43 to form a cargo curtain depending downwardly from ceiling 90 behind seats 43. Further, as shown in FIG. 13, second attachment features 28 can be coupled with additional ceiling anchors 97 such that substrate 24 is in the form of a ceiling net that can retain objects against ceiling 90. Alternatively, second attachment features 28 can be coupled with respective grab handles (not shown) that can be positioned along ceiling 90 in place of the additional ceiling anchors 97.

Figure 14:
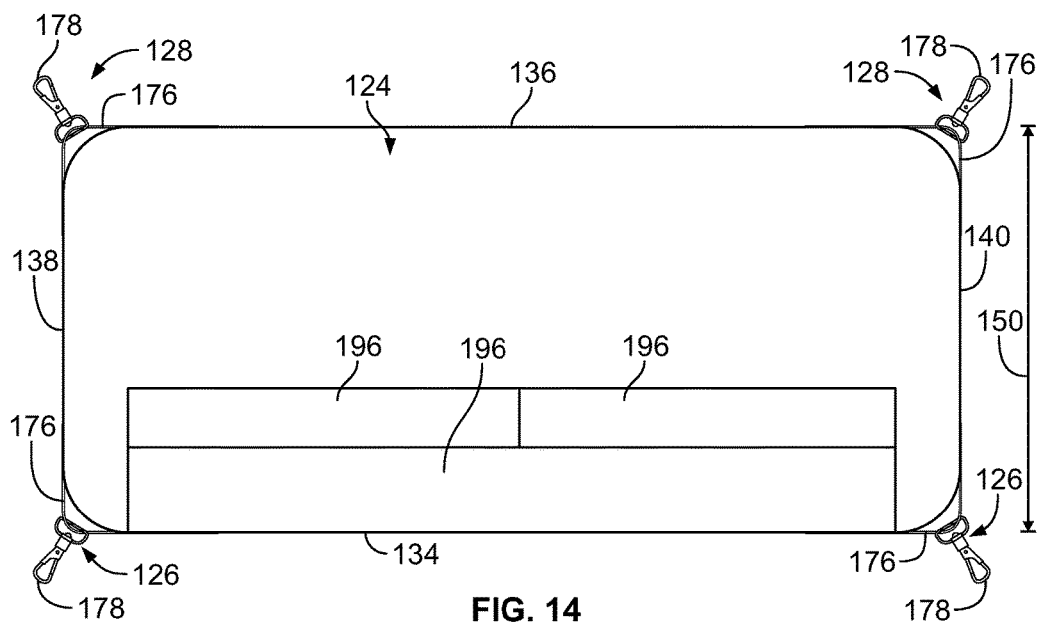
FIG. 14 is a top elevational view of an alternative cargo net useable in a cargo management system.

As shown in FIG. 14, an additional embodiment of substrate 124 is shown having a plurality of pockets 196 disposed therealong. Pockets 196 can be positioned so as to be available for access by a user when substrate 124 is in a position similar to the pouch position shown in FIG. 3, for example. In such an embodiment, pockets 196 can further be available for use by a user for the storage of objects or the like when substrate 124 is in others of the various positions and configurations shown with respect to substrate 124 in FIGS. 1-13, as discussed above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A cargo management system for a vehicle, comprising:
   first and second pairs of anchors positioned adjacent each other, and a third pair of anchors positioned remote from the first pair; and
   a flexible substrate having a first pair of attachment features coupleable with the first pair of anchors and a second pair of attachment features selectively coupleable with the second pair or third pair of anchors;
   wherein:
   a distance between the first pair of anchors and the third pair of anchors is about equal to a length of the substrate; and
   the first and second pairs of anchors are disposed at a height above a floor of a cargo area of the vehicle equal to about one-half of the length of the substrate.

2. The cargo management system of claim 1, wherein:
   the substrate defines a rectangle having first and second long sides and first and second short sides; and
   the first pair of attachment features is disposed along the first short side with first and second ones of the first pair of anchors respectively disposed at intersections of the first short side with the first and second long sides, and the second pair of attachment features is disposed along the second short side with first and second ones of the second pair of anchors respectively disposed at intersections of the second short side with the first and second long sides.

3. The cargo management system of claim 1, wherein each of the first, second, and third pairs of anchors has a first anchor disposed on a first lateral side of a cargo area of the vehicle and a second anchor disposed on a second lateral side of the cargo area of the vehicle.

4. The cargo management system of claim 1, wherein the second pair of anchors is positioned adjacent the first pair of anchors at a distance such that, when the first pair of attachment features is coupled with the first pair of anchors and the second pair of attachment features is coupled with the second pair of anchors, the substrate defines a first edge extending between the first attachment features, a second edge extending between the second attachment features, and a pouch portion extending downwardly between the first and second edges.

5. The cargo management system of claim 4, wherein the substrate includes a pocket thereon that is positionable on an outwardly disposed surface of the pouch portion.

6. The cargo management system of claim 1, wherein:
   the vehicle includes a cargo area of the vehicle having a window therein; and
   the first, second, and third pairs of anchors are positioned adjacent to and below the window.

7. The cargo management system of claim 1, further including a plurality of floor anchors positioned adjacent a floor of a cargo area of the vehicle, wherein ones of the first and second pair of attachment features are respectively coupleable with ones of the floor anchors to position the substrate as a cargo net adjacent the floor of the cargo area.

8. The cargo management system of claim 1, further including a fourth pair of anchors coupled on a vehicle liftgate associated with a cargo opening of the vehicle, the first pair or second pair of attachment features being coupleable with the fourth pair of anchors such that the substrate depends downwardly from the liftgate when the liftgate is in an open position.

9. The cargo management system of claim 8, further including a first support pole coupleable with one of the second pair of attachment features when the first pair of attachment features is coupled with the fourth pair of anchors such that the substrate is suspended between the liftgate and the support pole.

10. The cargo management system of claim 1, further including a plurality of ceiling anchors positioned adjacent a ceiling of the vehicle, wherein ones of the first and second pair of attachment features are respectively coupleable with ones of the ceiling anchors to position the substrate as a cargo net adjacent the ceiling of the vehicle.

11. The cargo management system of claim 1, wherein the third anchors are within a cargo extension area of the vehicle.

* * * * *